(12) United States Patent
Dhonde et al.

(10) Patent No.: US 12,455,813 B1
(45) Date of Patent: Oct. 28, 2025

(54) UNIFIED TEST INTERFACE FOR TESTING A SYSTEM

(71) Applicant: Ethernovia Inc., San Jose, CA (US)

(72) Inventors: Anil Tukaram Dhonde, Amsterdam (NL); Darren S. Engelkemier, Menlo Park, CA (US); Roy T. Myers, Jr., Morgan City, CA (US); Hossein Sedarat, San Jose, CA (US)

(73) Assignee: Ethernovia Inc., San Jose, CA (US)

( * ) Notice: Subject to any disclaimer, the term of this patent is extended or adjusted under 35 U.S.C. 154(b) by 390 days.

(21) Appl. No.: 18/151,312

(22) Filed: Jan. 6, 2023

Related U.S. Application Data

(60) Provisional application No. 63/266,472, filed on Jan. 6, 2022.

(51) Int. Cl.
*G06F 11/3698* (2025.01)
*G06F 11/3668* (2025.01)

(52) U.S. Cl.
CPC ...... *G06F 11/3698* (2025.01); *G06F 11/3684* (2013.01); *G06F 11/3688* (2013.01)

(58) Field of Classification Search
None
See application file for complete search history.

(56) References Cited

U.S. PATENT DOCUMENTS

| 8,028,276 | B1* | 9/2011 | Bessonov | G06F 11/3684 |
| | | | | 717/124 |
| 10,157,122 | B1* | 12/2018 | Gohil | G06F 11/3684 |
| 2003/0009305 | A1* | 1/2003 | Eden | G06F 11/3698 |
| | | | | 714/E11.208 |
| 2005/0086022 | A1* | 4/2005 | Lindberg | G06F 11/3688 |
| | | | | 702/123 |
| 2017/0109257 | A1* | 4/2017 | Li | G06F 11/3688 |
| 2018/0089066 | A1* | 3/2018 | Barnett | G06F 11/3688 |
| 2018/0137035 | A1* | 5/2018 | Magre | G06F 11/3692 |

* cited by examiner

*Primary Examiner* — Qing Chen
(74) *Attorney, Agent, or Firm* — Schwegman, Lundberg & Woessner, P.A.

(57) ABSTRACT

Various embodiments provide for a unified interface for testing a system, which can include a device under test (DUT). In particular, some embodiments described herein can be used to implement a Unified Test Framework (UTF) that comprises an architecture that provides a unified (or common) software interface to one or more test methods used during a development life cycle of a system. Example test methods can include, without limitation, modeling, verification, simulation, emulation, validation, customer support, and the like.

20 Claims, 9 Drawing Sheets

UNIFIED TEST INTERFACE FOR TESTING A SYSTEM

CROSS-REFERENCE TO RELATED APPLICATION

This application claims priority to and the benefit of U.S. Provisional Patent Application No. 63/266,472, filed on Jan. 6, 2022, which is incorporated herein by reference.

TECHNICAL FIELD

Embodiments described herein relate to data communications and, more particularly, to systems, methods, devices, and instructions relating to a unified interface for testing a system, which can include a device under test (DUT).

BACKGROUND

Traditional testing of a system (e.g., device under test (DUT)) involves multiple separate teams (e.g., development teams), and usually individual teams use their own methodologies, languages, scripts, testbenches, and tests to achieve their testing objectives (e.g., verification, firmware/software testing, validation, and customer support) with respect to the system. Examples of the different teams can include, without limitation, a design verification (DV) team, a hardware bring-up and validation team, a firmware or software team, an architecture and design team, and a Quality Assurance (QA) team (e.g., System-level QA team). The system under test (e.g., DUT) can include an Application Specific Integrated Circuit (ASIC), a Field Programmable Gate Array (FPGA), a hardware model, a software model, or the like.

Generally, a DV team verifies the RTL (Register Transfer Language) that goes into a semiconductor (e.g., FPGA or ASIC). The RTL is typically verified against a model often written in System Verilog and sometimes in SystemC, C or C++. A separate testbench may be used to verify gate-level simulations or power simulations. A hardware bring-up and validation team verifies that a semiconductor meets prescribed specifications, and testing usually involves using a language like Python to design tests and the system (e.g., DUT) communicating to an evaluation (or reference) board. A firmware or software team can develop software to run on the system (e.g., DUT), and typically use a language like C++ with different methodologies, scripts, and tests. A firmware/software team often tries to abstract the hardware in a Hardware Abstraction Layer (HAL). Additionally, a firmware/software team often tests for customer-specific use or failure cases, often with its own set of methodologies, scripts, and tests. With respect to semiconductors, a Digital Signal Processing or Analog team can be involved for certain semiconductor applications, and such a team can use their own pre, post, or customer support methodologies, scripts, and tests, which can include MATLAB, SIMULLINK or mixed mode (e.g., analog plus digital) simulations. An architecture or design team often validates architecture on high-level, abstracted models (e.g., in C/C++, MATLAB, or Python) that are feature accurate but not intended to accurately represent hardware. A System-level Quality Assurance (QA) team can create tests and test benches for white box, black box, and system integration testing, which can be implemented using commercially available or open-source test benches.

Overall, the resources, cost, and timelines for developing and maintaining test infrastructure (e.g., test benches, scripts, tests, databases, regression suites) for one or more systems under test (e.g., DUTs) can be enormous and expand with the ever-increasing complexity and size of systems (e.g., semiconductors). As a result, test infrastructure can become cost prohibitive for future development, especially for resource-constrained organizations.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
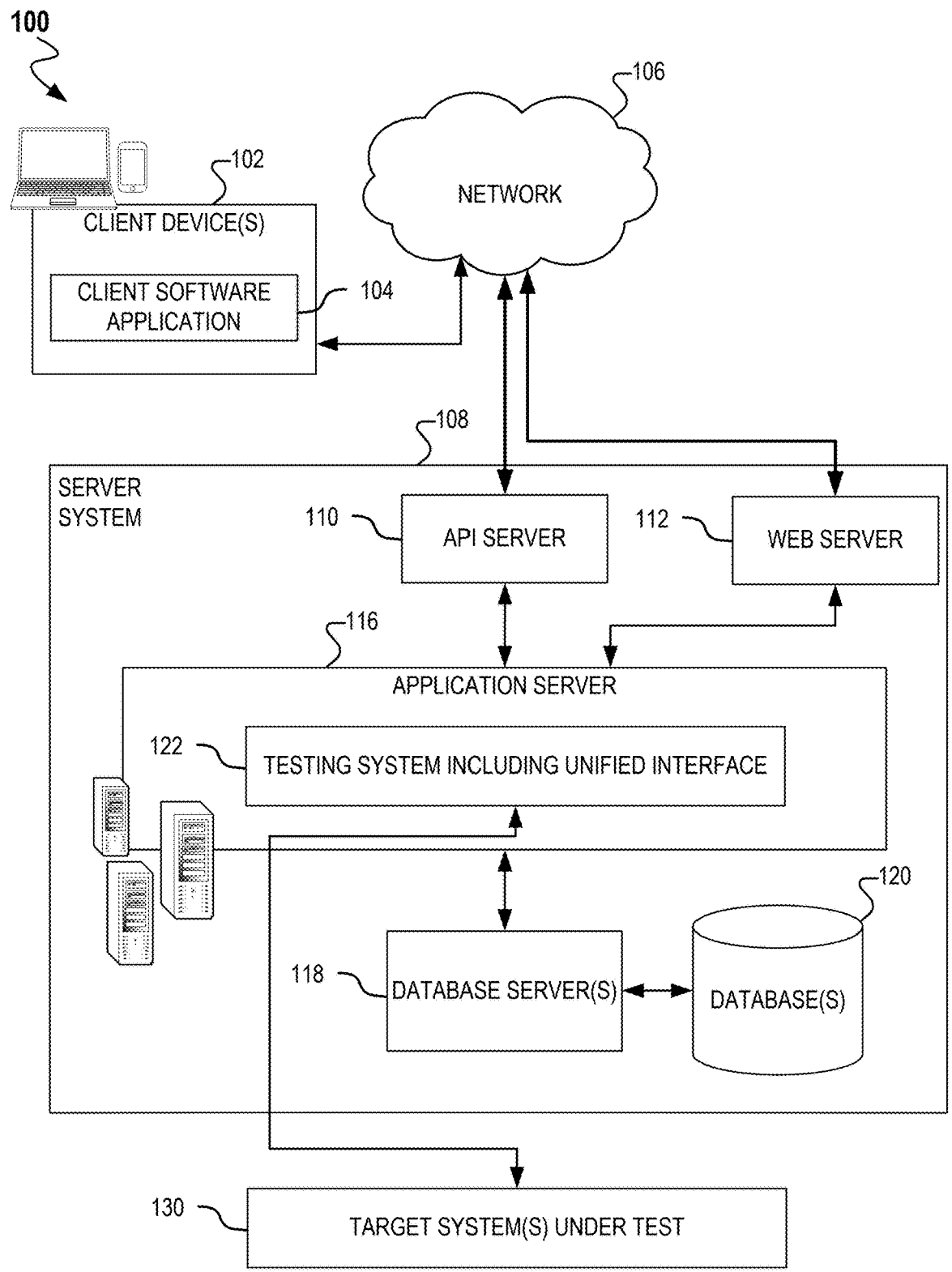
FIG. 1 is a block diagram showing an example data system that includes a testing system including a unified interface, according to various embodiments.

Various embodiments provide for a unified interface for testing a system, which can include a device under test (DUT). In particular, some embodiments described herein can be used to implement a Unified Test Framework (UTF), which can address deficiencies of conventional testing infrastructure technology. According to some embodiments, the UTF comprises an architecture that provides a unified software interface (or common software interface) to one or more test methods used during a development life cycle of a system (such as the development of a silicon chip), where the test methods can include modeling, verification, simulation, emulation, validation, customer support, and the like. For instance, the UTF can provide a unified interface to all test methods in the development life cycle of a silicon device, which can include (without limitation) model-based verification, simulation, emulation (e.g., FPGA emulation), and testing on target hardware (e.g., semiconductor). Various embodiments integrate, re-use, and build upon lower-level work to provide an abstracted higher-level representation of a system under test, where system-specific information (e.g., for DUT) can be used at the lowest level and enable a test writer at the highest level to write a test without knowledge of the specific system under test. In doing so, some embodiments can enable tests to be constructed agnostic of behavior and implementation of a system under test.

As used herein, a system (e.g., device) under test (e.g., on which one or more tests will be executed) can be referred to as a target system (e.g., target device). A target system can comprise one or more hardware components, one or more software components, or a combination of both. Various embodiments can facilitate one or more tests on a target system using one or more test methods.

As used herein, a test case can define at least one test to be performed with respect to a target system. The test case can be designed to perform a test (e.g., using one or more test methods) on a target system independent of the implementation domain of the target system (e.g., the test case is designed independently of whether it eventually runs on a C model, FPGA, a silicon chip of the target system). For some embodiments, the test case is implemented by a test function, which can be defined by a sequence of commands (e.g., target-agnostic test commands). A test case can be described in a test file (e.g., an executable test file, such as a test script), where the test file can comprise information regarding the test case (e.g., a definition of a test function implementing the test case, test configuration information, and test input data to be used by the test function). A test file for a test case can make calls to one or more functions (e.g., test case functions) that facilitate initialization of the test case, configuring of the test case, execution of the test case, and processing of test results of the test case. The test case can be designed (e.g., defined or configured) by a user who serves as a test creator. An example of a user who designs a test case can include, without limitation, a quality assurance (QA) engineer, a system architect, a block designer, a software engineer, or a digital verification engineer.

As used herein, a test method can comprise a software interface (e.g., interface function defined by an API) to control and monitor a target system to facilitate a test on the target system. For instance, a test method can comprise a software interface to a testing tool (e.g., C-based model, System Verilog, Simulink Model, etc.) provided by a target system to facilitate a test on the target system. A given test method for a given target system can be implemented as a software interface library, and the software interface library can be in source form (e.g., that is interpreted at run-time, such as Python source code) or precompiled (e.g., as a binary library) for the given target system. In this way, a test method can be called on by an embodiment (e.g., UTF) for execution on a target system.

Various embodiments enable multiple different test methods (e.g., C-based model, System Verilog, Simulink Model, etc.) to be unified under a unified test interface, and enable independent test development (e.g., which can include test creation, test configuration, test execution, and test result processing). For instance, various embodiments enable test development independent of the target system being tested, the software language(s) (e.g., C, C++, and Python) used to implement or define tests, test protocols being used, or test tools/benches being used. As a result, various embodiments can affect how firmware/software, verification, validation, and quality assurance are architected, developed, and executed to leverage, re-use, and minimize the work across the different teams assisting in the development of a system (e.g., DUT). Various embodiments enable a developer (e.g., software developer) to focus on higher-level system test functions without knowledge of what's beneath the lowest-level hardware abstraction layers, such as register read or write functions of a system under test that have already been developed and verified by say a verification engineer. In addition, some embodiments can enable target swapping and comparison at various module and top levels between software and hardware, as well as pre and post-silicon, which can include models, blocks, sub-systems comprised of multiple blocks, netlists, semiconductors (e.g., FPGAs, ASICS, etc.) emulation, customer returns, and the like. Further, some embodiments enable the reuse of tests (e.g., between pre and post-silicon) across different teams and development phases, which in turn can promote the creation of a common test vault (e.g., a library of tests) across the different teams and different domains of development.

Some embodiments enable a test case to be written (e.g., by a development team member) in a human-readable format (such as JavaScript Object Notation (JSON)) without any knowledge of how to code or write in a software language (e.g., Python or C++ or a hardware language like System Verilog). By providing a common software interface with abstracted partitioned layers, an embodiment enables each team (e.g., development team) of a system to work in their area of greatest expertise/contribution while leveraging the expertise/work of other teams. Additionally, an embodiment enables the development of target agnostic test cases, where users (e.g., test writers) from diverse domains can create a common suite of tests (e.g., a library of tests or test vault) to be used across different teams and different domains of development. For some embodiments, one or more test libraries or vaults can be created for use in test execution. The overall result of using an embodiment can include improved system quality, decreased resources needed in testing, reduced time to market, and minimized redundancy of work and discrepancy in results. Additionally, a common (or unified) test output (or test results) provided by a processing mechanism of some embodiments can harmonize comparative analysis of test output (results) across diverse targets, which can save time and significantly increase quality metrics.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes a testing system including a unified interface 122 (hereafter, the testing system 122), according to various embodiments. As shown, the data system 100 includes one or more client devices 102, a server system 108, and a network 106 (e.g., including Internet, wide-area-network (WAN), local-area-network (LAN), wireless network, etc.) that communicatively couples them together. As also shown, the data system 100 also includes one or more target systems under test 130 (hereafter, the one or more target systems 130), which is operatively coupled to the testing system 122 such that the testing system 122 can cause test methods to be executed with respect to the one or more target systems 130 (e.g., according to one or more defined tests). Depending on the embodiment, the client devices 102, the server system 108, the one or more target systems 130, or each of these can be implemented (at least in part) by machine 900 of FIG. 9. The one or more target systems 130 can include a device under test (DUT), such as a silicon-based device (e.g., circuit chip) under development. Each client device 102 can host a number of applications, including a client software application 104, which can cause one or more defined tests (e.g., test scripts) to be executed with respect to the one or more target systems 130. The client software application 104 can communicate data with the server system 108 via a network 106. Accordingly, the client software application 104 can communicate and exchange data with the server system 108 via network 106.

The server system 108 provides server-side functionality via the network 106 to the client software application 104. While certain functions of the data system 100 are described herein as being performed by the testing system 122 on the server system 108, it will be appreciated that the location of certain functionality within the server system 108 is a design choice. It can be technically preferable to initially deploy certain technology and functionality within the server system 108, but to later migrate this technology and functionality to the client software application 104 where the client device 102 provides various operations as described herein.

The server system 108 supports various services and operations that are provided to the client software application 104 by the testing system 122. Such operations include transmitting data from the testing system 122 to the client software application 104, receiving data from the client software application 104 to the testing system 122, and the testing system 122 processing data generated by the client software application 104. Data exchanges within the data system 100 can be invoked and controlled through operations of software component environments available via one or more endpoints, or functions available via one or more user interfaces of the client software application 104, which can include web-based user interfaces provided by the server system 108 for presentation at the client device 102.

With respect to the server system 108, each of an Application Program Interface (API) server 110 and a web server 112 is coupled to an application server 116, which hosts the testing system 122. The application server 116 is communicatively coupled to a database server 118, which facilitates access to a database 120 that stores data associated with the application server 116, including data that can be generated or used by the testing system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke the functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functions of the testing system 122 of the application server 116.

The application server 116 hosts a number of applications and subsystems, including the testing system 122, which supports various functions and services with respect to various embodiments described herein.

The application server 116 is communicatively coupled to a database server 118, which facilitates access to database 120, which stores data associated with the testing system 122, such as one or more defined tests (e.g., one or more test scripts). For instance, the database 120 can serve as a common test library suite (or vault) across different domains of development (e.g., corresponding to different teams) and different target systems.

The server system 108 supports various services and operations that are provided to the testing system 122 to facilitate data exchange between the testing system 122 and the one or more target systems 130. Such operations include transmitting data from the testing system 122 to at least one of the one or more target systems 130, receiving data from at least one of the one or more target systems 130 to the testing system 122, and the testing system 122 processing data generated by the at least one of the one or more target systems 130. For instance, communicated data can facilitate execution of one more test methods with respect to at least one of the one or more target systems 130, and receiving one or more test method results from at least one of the one or more target systems 130.

Figure 2:
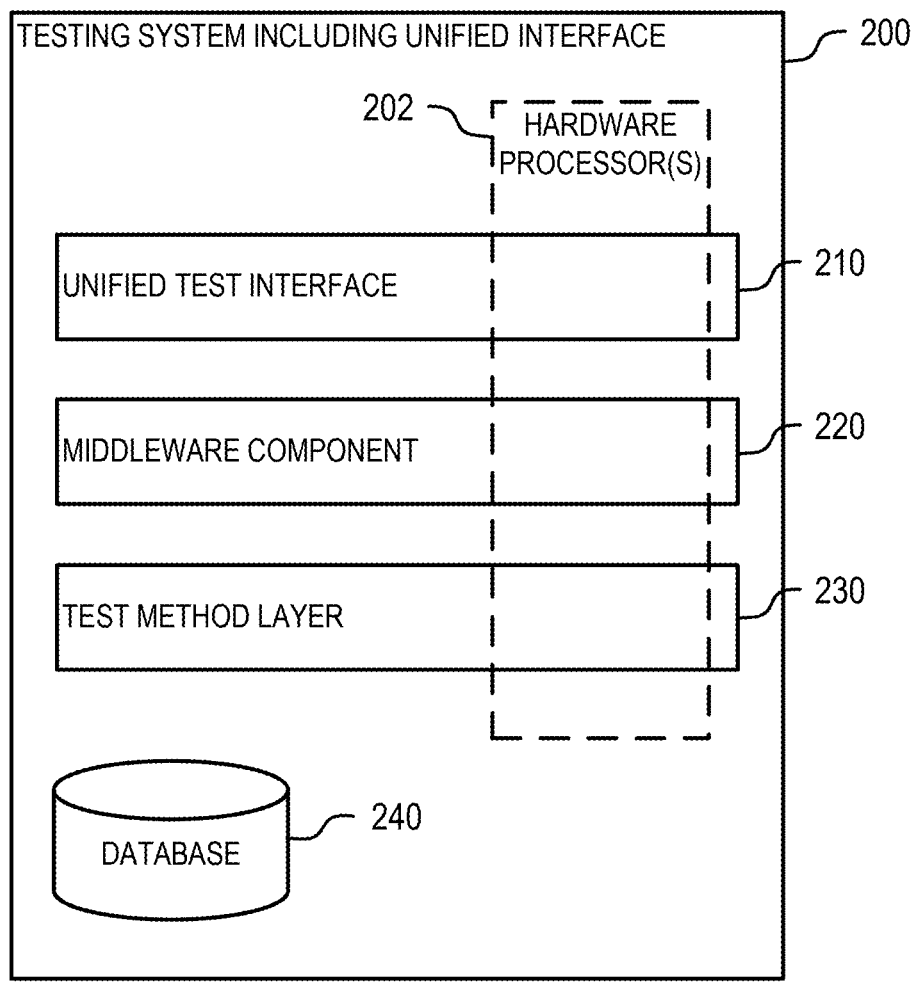
FIGS. 2 through 4 are block diagrams illustrating example testing systems including a unified interface, in accordance with some embodiments.

FIG. 2 is a block diagram illustrating an example testing system including a unified interface 200 (hereafter, the testing system 200), in accordance with some embodiments. For some embodiments, the testing system 200 represents an example of the testing system 122 described with respect to FIG. 1. As shown, the testing system 200 comprises a unified test interface 210, a middleware component 220, and a test method layer 230. According to various embodiments, one or more of the unified test interface 210, the middleware component 220, and the test method layer 230 are implemented by one or more hardware processors 202. Data used or generated by one or more of the unified test interface 210, the middleware component 220, and the test method layer 230 may be stored in a database (or datastore) 240 of the testing system 200.

The unified test interface 210 is configured to be used by a user to create, configure, and run a test case with respect to one or more target systems. The unified test interface 210 is accessible via an application program interface, where the application program interface defines a set of test case functions (e.g., Initialize, configure, run, process results, etc.) in a specific language (e.g., programming language), and where the application program interface is configured to provide access of the set of test case functions to test cases that are defined using the specific language and that use the set of test case functions (through the unified test interface) to define and run tests with respect to at least one target system under test. Different application program interfaces for the unified test interface 210 can be created for different languages (e.g., different programming languages) used to define test cases.

For some embodiments, the set of test case functions comprises an initialization function to define the test case, where execution of the initialization function can cause the test case data to be sent from the unified test interface 210 to the middleware component 220. An input parameter of the initialization function can comprise a first parameter specifying the test function that implements the test case, and a second parameter specifying test input data (e.g., input JSON file) to be used by the test function during the execution of the test case, where the test case data includes the test input data. The set of test case functions can comprise a configure function to request one or more resources for executing the test case by the middleware component 220. The set of test case functions can comprise a run (or start) function to start the execution of the test case by the middleware component 220. The set of test case functions can comprise a process-result function to process output data collected by the middleware component 220 from the target system during the execution of the test case.

For some embodiments, a user creates a test file (e.g., test script) for a test case, and the test file uses an application program interface (API) to access the unified test interface 210 to create, configure, run, and process (e.g., post-process) results of the test case on a target system, where the API is compatible with a language (e.g., software language, such as Python) used by the test file. In this way, the API can serve as a template for a user to create, configure, run, and process the results of a test case. Various embodiments provide different APIs for different languages used in test files to define test cases.

The middleware component 220 is configured to take input data (e.g., test case data) from the unified test interface 210, process the input data, and run one or more tests on a target system based on the input data. For some embodiments, the middleware component 220 is configured to receive test case data for a test case from the unified test interface 210, where the test case data comprises a definition of a test function that implements the test case, and where the test function is defined by a set of calls to target-agnostic test commands supported by the middleware component 220. Additionally, for some embodiments, the middleware component 220 is configured to execute, based on the test case data, the test function by executing the set of calls to target-agnostic test commands (e.g., using a command engine). According to some embodiments, the set of calls comprises at least one call to a target-agnostic test command that causes the target system to be controlled or monitored (e.g., to perform one or more tests on the target system) through at least one software interface library of the test method layer 230, where the at least one software interface library provides access to at least one test method of the target system. For example, the at least one test method can be associated with one of modeling (e.g., C/C++ model), verification (e.g., System Verilog), simulation (e.g., Simulink), emulation (e.g., FPGA emulation), or validation. The middleware component can comprise a target system support library (e.g., a SWIG-based interface) that the middleware component 220 uses to access the at least one software interface library (e.g., corresponding to a test method) of the test method layer 230. For some embodiments, the set of target-agnostic test commands comprises at least one of a logging command, a monitoring command, a breakpoint command, a trigger command, or an event capture command. Additionally, the middleware component 220 can be configured to generate test output data (e.g., output JSON file) based on the execution of the test case, where the test output data can comprise data collected by the middleware component 220 during the execution of the test case.

The middleware component 220 can further provide one or more test results via the unified test interface 210. The middleware component 220 can serve as an engine of a unified test framework. For some embodiments, the middleware component 220 support one or more target-agnostic test commands that a test case (e.g., a test function of the test case) can use one or more test methods to facilitate one or more tests on a target system. Additionally, the middleware component 220 can provide one or more target system support libraries that provide test-agnostic test commands access to use one or more test methods. In this way, the middleware component 220 can abstract control and monitoring of a target system to facilitate one or more tests according to a test case. The level of abstraction provided by the middleware component 220 can enable a user (e.g., test designer) to create a test case (via the unified test interface 210) without having to deal with or care about the target system that the test case is testing.

The test method layer 230 comprises one or more software interface libraries that provide the middleware component 220 with access to test methods on a target system, by which the middleware component 220 can control and monitor the target system to facilitate one or more tests. In this way, the software interface libraries can serve as a translation layer between the middleware component 220 and target systems. Each software interface library of the test method layer 230 can correspond to (e.g., be pre-compiled for) a different target system, and each software interface library of the test method layer 230 can comprise a program language interface (e.g., C structures and function calls). For some embodiments, each of the software interface libraries of the test method layer 230 is implemented as and adheres to (or complies with) a common application program interface (API) (or unifying API) (e.g., C API). In doing so, the test method layer 230 can provide the middleware component 220 with standardized/unified software interfaces (common software interfaces) to test methods provided by the target system. Each of the standardized/unified software interfaces of a test method can permit the middleware component 220 to access a non-standard software interface provided by the target system to test methods implemented on the target system and can permit such access without any target-dependent workarounds on the middleware component 220. The use of standardized/unified interfaces to test methods is useful when different target systems provide a unique, non-standard (e.g., proprietary) software interfaces for an external entity to communicate, control, and execute tests on the different target systems. Accordingly, the test method layer 230 can provide unification of non-standard software interfaces to test methods of different target systems so that the middleware component 220 can execute tests without target dependency.

Figure 3:
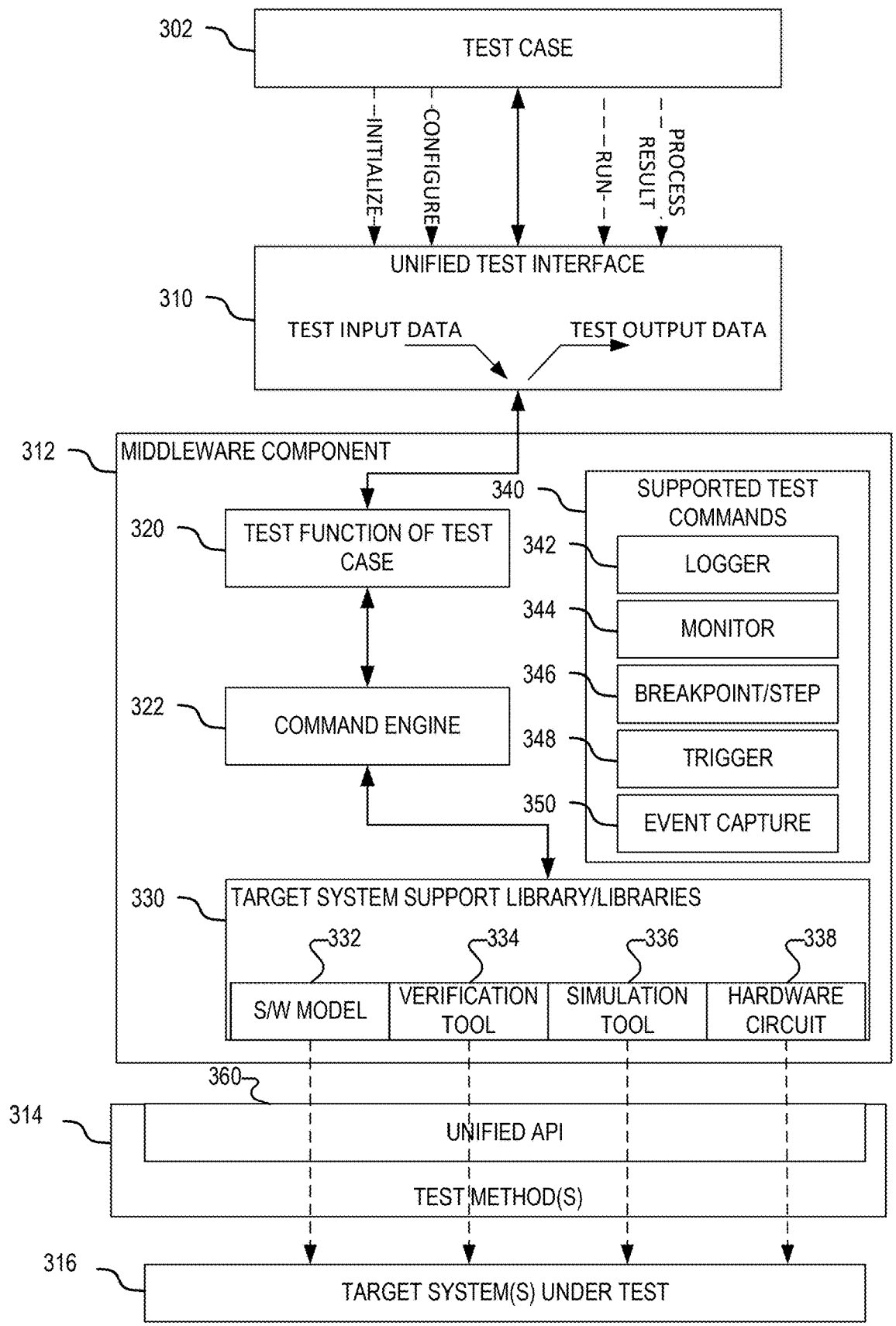

FIG. 3 is a block diagram illustrating an example testing system including a unified interface, in accordance with some embodiments. In particular, the example testing system of FIG. 3 comprises a unified test interface 310, a middleware component 312, and one or more test methods 314. According to some embodiments, the unified test interface 310 represents an example of the unified test interface 210 described with respect to FIG. 2, the middleware component 312 represents an example of the middleware component 220 described with respect to FIG. 2, and the one or more test methods 314 represents an example implementation of the test method layer 230 described with respect to FIG. 2.

As shown, a test case 302 can interact with the unified test interface 310 (e.g., via an API compatible with the language of the test case) and call one or more test case functions provided by the unified test interface 310, such as a initialize function, a configure function, a run function, and a process-result function. For instance, through the initialize function, the test case 302 can supply (e.g., register) information regarding the test case 302, such as test input data (e.g., input JSON file), a test function 320 that implements the test case, information specifying one or more target systems 316 under test on which the test case is being executed. An example of an initialize function is provided in Table 1. As shown, a test function of the test can be provided through utfTestInit ( . . . ) function as a parameter.

TABLE 1

```
utfTestInit (
        name, testFunction,
        listOfInputJsonFiles, listOfOutputJsonFiles,
        <optional arguments>
                logDirectory,
                <one or more targets>,
                < conditions for StopOnFail>,
                <list of breakpoints>,
                ...
)
```

Through the configure function (e.g., utfTestCfg ( . . . )), the test case 302 can request the unified test interface 310 to configure the test case 302, which can include allocating resources to perform the test case 302, such as the one or more target systems 316, creating log directories, loading target system support libraries, and the like. If any requested resource is unavailable, the configure function can declare a configuration failure. An example of a configure function is provided in Table 2.

TABLE 2

```
def utfTestCfg(self):
    parseJsonCfg(...)
    attr = getAttributes(...)
    return attr
```

Through the run function (e.g., utfTestRun ( . . . )), the test case 302 can start running (e.g., execution of) the test case 302 by a command engine 322 of the middleware component 312. The running of the test case 302 can cause a test function 320 (e.g., implemented as a Python function) implementing the test case 302 to be executed by the middleware component 312, and cause the test function 320 to be executed based on information provided by the test case 302 to the middleware component 312 through the unified test interface 310 (e.g., by the initialize function). After the test function 320 completes execution, data generated by the test function 320 can be collected by the middleware component 312. An example of a run function is provided in Table 3.

TABLE 3

```
def utfTestRun(self):
    startLogger(VERBOSITY_LEVEL)
    result = runTestScenario( )
    return result
```

Through the process-result function (e.g., utfTestProcess-Result ( . . . )), the test case 302 can cause data collected from the one or more target systems 316 as the test function 320 is executed by the command engine 322. For instance, the process-result function can post-process output data/logs from a test, can evaluate the data collected against one or more test pass criteria, evaluate the data collected against one or more test fail criteria, comparison of the data collected, or performing statistics on the data collected. Data collected by the middleware component 312, processed data generated by the process-result function, or both can be provided by the middleware component 312 to the unified test interface 310 as test output data (e.g., output JSON file). The test output data provided to the unified test interface 310 can be saved in one or more files. An example of a process-result function is provided in Table 4.

TABLE 4

```
def utfTestProcessResult(self):
    result = diffWithGoldenReference(...)
    return result
```

For some embodiments, the set of test case functions comprises a test result function, which can provide one or more pass/fail result criteria (e.g., one or more binary pass/fail result criteria) for the test case 302. In particular, the test case 302 can use a test result function to provide a pass/fail function (e.g., implemented as a Python function) for the test case 302. The body of the pass/fail function can call on one or more test commands from the supported test commands 340. The return of a pass/fail function can be a Boolean value (e.g., of True for Pass, and False for Fail). For some embodiments, when the process-result function is called by the test case 302, the process-result function can call on (cause the execution of) the pass/fail function provided by the test case 302 via the test result function. An example of a test result function is provided in Table 5.

TABLE 5

```
def utfTestResultFunction (...)
    result = false
    if crcCalculated == crcCheckSum result = true
    return result
```

A test pass/fail criterion can depend on a test case itself. A pass/fail decision can comprise one or more simple checks. For instance, for a test data check, the pass/fail decision can be based on the detection of a CRC checksum error. For a data packet forwarding check, the pass/fail decision can comprise checking whether the data packet was forwarded to an unexpected port. For statistical checks, the pass/fail decision can comprise determining whether a data traffic rate is maintained through the test. For a threshold check, the pass/fail decision can comprise determining whether a signal-to-noise ratio (SNR) margin is below a certain threshold. For a historical comparison check, the pass/fail decision can comprise determining whether SNR degradation occurs over time on the same test setup.

For a test that depends on a complex pass/fail criterion (e.g., combination of outgoing data packet data, metadata, and event sequence), test output data can be difficult to check against every test run. Accordingly, for some embodiments, the process-result function can generate a pass/fail decision by comparison of a test output with a previously known golden reference. More regarding this is described with respect to FIG. 5.

An example of a test function (e.g., 320) for a test case (e.g., 302) that can be executed by a middleware component (e.g., 312) is provided below in Table 6. In particular, the example test function of Table 6 is written in Python and facilitates performing one or more tests (involving a sending network data frame) on a target system (e.g., 316) without knowledge of the implementation of the target system.

TABLE 6

```
def simpleFrameTestFunction( ... ):
    # setup logging, events and triggers for the test setTrigger(
        headerLookupSome Trigger )
        setLoggerEnable( fullVerbosity ) setEventCapture(
        parserStage3IpHeader )
    # run the test i.e. send a frame sendFrameToPort(
        inTimeStamp, inputPortId )
```

TABLE 6-continued

```
        # wait, monitor until the frame is processed waitForOutputFrame ( outputportId )
        # disable logging that might not be required anymore setLoggerDisable( )
        # run checks, collect stats for utfProcessResult(...) calculateTransitTime (
inTimeStamp, outTimeStamp )
checkCrc ( frameData ) checkOutFrameHeader (
frameData ) logFrameMetaData ( outputJsonFile )
        # Clean end to the Test - relinquish resources
endTest ( )
```

For some embodiments, the test input data comprises one or more human readable files, such as input JSON files, that construct one or more inputs for a test of a test case (e.g., the test case 302). An example of an input JSON file is provided below in Table 7, where test data (e.g., Ethernet Frame data) is separated from the meta data that is used by the middleware component 312.

TABLE 7

```
{
    "version": "1.0",
    "type" : "input",
    "name": "SingleFrameTest", "data" : {
        "metadata" : {
            "in" : {
                "timestamp" : "0x34787877", "port" : "0x4"
            }
        },
        "testData" : {
            "frame" : { "preamble": "7B",
                "sfd" : "1B",
                "destAddr" : "0x00000000DEAD", "srcAddr" :
                "0x00000000BEEF",
                "ethType" : "0x8000", "payload":
                "0xDEADBEEF", "checkSum" : "0x00213233"
            }
        }
    }
}
```

For some embodiments, the test output data comprises one or more human-readable files, such as output JSON files, that can capture data output (e.g., results of one or more particular tests performed) generated by a run (e.g., execution) of a test case (e.g., test case 302). The one or more human-readable files (e.g., output JSON files) can allow the middleware component 312 to perform common and unified test result processing, which in turn can permit comparative analysis across diverse target systems and technology domains. An output JSON file can include metadata from execution of the test case (e.g., output timestamps, ports relevant to tests performed), and data collected the by one or more target systems 316 (e.g., a data frame). Test output data can be optional, as not all test cases may cause generation of test output data. An example of an output JSON file is provided below in Table 8.

TABLE 8

```
{
    "version": "1.0",
    "name": "SingleFrameTest", "type" : "output",
    "data" : {
        "metadata" : {
            "in" : {
                "timestamp" : "0x34787877", "port" : "0x4"
            },
            "out" : {
                "timestamp" : "0x44556688", "port" : "0x8"
            }
```

TABLE 8-continued

```
        },
        "testData" : {
            "frame" : { "preamble": "7B",
                "sfd" : "1B",
                "destAddr" : "0x00000000DEAD", "srcAddr" :
                "0x00000000BEEF",
                "ethType" : "0x8000", "payload":
                "0xDEADBEEF", "checkSum" : "0x00213233"
            }
        }
    }
}
```

For some embodiments, the middleware component 312 is configured to receive from the unified test interface 310 test case data for the test case 302, where test case data can comprise the test function 320 (e.g., definition of the test function 320) and test input data. The test case data can include additional information (e.g., information specifying one or more target systems 316, etc.), such information submitted to the unified test interface 310 by the test case 302 using an initialize function. The test function 320 can be defined by a set (e.g., sequence) of calls to target-agnostic test commands supported by the middleware component 312. Supported test commands 340 of the middleware component 312 represents various test commands that the test function 320 can call upon during execution (e.g., by a command engine 322), and each target-agnostic test command called by the test function 320 can represent one of the supported test commands 340.

As shown, the supported test commands 340 can include commands (e.g., helper commands or functionality) provided by a logger 342, a monitor 344, a breakpoint/step mechanism 346, a trigger mechanism 348, an event capture mechanism 350, and possibly other mechanisms not shown, which can assist the test function 320 in performing one or more tests on the one or more target system 316. Over time, additional commands can be added to the supported test commands 340, thereby enabling the supported test commands 340 to evolve as new test infrastructure is created and the testing system to be extensible. Accordingly, if a new test requires a new test command, then it can be added to the supported test commands 340, which can help other tests reuse the test command. The supported test commands 340 can represent a library of test commands that are abstracted from target systems under test, and that never have any specific ties to any particular target system.

Depending on the embodiment, commands of the supported test commands 340 that are provided by the logger 342 can include any command to facilitate logging on the middleware component 312. For instance, a command associated with the logger 342 can support multiple types of streams (e.g., info, debug, error), and these streams can be independent or can be unified as needed. For instance, debug and error streams can be unified while debugging a test case and then, once done debugging (e.g., during the submission of the test), the debug stream can be removed to reduce the noise level. A command associated with the logger 342 can provide different levels of verbosity (e.g., beginning with 0 and limitless level of verbosity) in the logged data. For instance, the command can use mask bits to turn on/off logging from different blocks (e.g., a 32-bit or 64-bit data block). As another example, noisy logging can be enabled at the start and end of a test case, but in the middle of the test case noise case be reduced. A command associated with the logger 342 can direct logs to or can capture logs on different pipes (e.g., stdout, stderr, files). Logs captured by the logger 342 can be human readable text, such as a JSON format, or can be binary data. The logs (e.g., regression logs) can contain valuable data for parsing/mining to study trends (e.g., SNR degradation over time). The log can be time-stamped with tags/metadata that can show real timestamps. Logging by the logger 342 can allow the use of network or remote directories, files, or pipes/streams (e.g., stdout, stdin).

Commands of the supported test commands 340 that are provided by the monitor 344 can provide monitoring functions that work as synchronous or asynchronous methods to monitor a test on the one or more target systems 316. The monitoring function can be asynchronous, parallel, non-intrusive, or some combination thereof.

Commands of the supported test commands 340 that are provided by the breakpoint/step mechanism 346 can insert a breakpoint or a step within a test function, which can assist in test debugging. A breakpoint or a step can be at a command level (e.g., each command execution can be stepped through). For some embodiments, a breakpoint can be specified by an initialize function received by the unified test interface 310, or at run-time while the test function 320 is executing. A breakpoint can be the line number of the Command in the test function 320. Step-through can be supported for one command at a time. Breakpoints and steps can be simultaneously supported such that after hitting a breakpoint, the user (e.g., test user) can be able to step through the next command and then release to continue as necessary.

Commands of the supported test commands 340 that are provided by the trigger mechanism 348 can include triggering a waveform capture, triggering a slicer, or triggering a simple action in response to an event. A command of the trigger mechanism 348 can enable a user to specify one or more trigger conditions, to ignore the number of conditions to be counted before a trigger engages, to stop on a trigger condition, or to continue. Once the trigger condition is met (e.g., trigger is hit), the test function 320 can "hold" until a user interaction or an automated stimulus is provided. Automated stimulus can be used for regression runs where there is no user interaction. An example of this would be to hit a trigger condition to capture a waveform and then proceed with the test function 320 as normal (given that a waveform capture might take some time and a trigger is necessary to hold the test condition). Holding the test function 320 static can facilitate debug capturing.

Commands of the supported test commands 340 that are provided by the event capture mechanism 350 can be capture/log events as the test function 320 is progressing without holding the test function 320 static (unlike a command of the trigger mechanism 350). A command of the event capture mechanism 350 can assist a user in logging a specific event during the execution of the test function 320, such as IPv6 header being found or packet processing recursion count. The event capture mechanism 350 can use the logger 342 to capture events or specific captures (e.g., debug memory-based capture, waveform capture, register dumps, event callbacks, etc.).

For some embodiments, the middleware component 312 is further configured to execute, based on the test case data, the test function 320 by executing the set of calls to target-agnostic test commands. For various embodiments, the set of calls comprises at least one call to a target-agnostic test command that causes the one or more target systems 316 to be controlled or monitored (e.g., via one or more test methods 314) through at least one software interface library for the one or more target systems 316 (e.g., at least one software interface library to access at least one test method from the one or more test methods 314 for the one or more target systems 316). As shown, the middleware component 312 comprises a command engine 322, which is configured to facilitate the execution of the test function 320.

For some embodiments, the command engine 322 can execute target-agnostic commands of the test function 320 and send commands to the one or more target systems 316 (e.g., via one or more target system support libraries 330) to control and monitor the one or more target system 316 to facilitate one or more tests according to the target-agnostic commands. In this way, the command engine 322 enables the test function 320 to "drive" one or more tests with respect to the one or more target systems 316. The command engine 322 can receive target-agnostic test commands in a sequence from the test function 320 and can execute them via the one or more target system support libraries 330 of the middleware component 312. Depending on the embodiment, a supported test command can be executed by the command engine 322 asynchronously or synchronously, and can be batched together with one or more other supported test commands for execution by the command engine 322. A supported test command can have a command identifier (ID) and can include a callback function, so that asynchronous responses can be handled. More regarding the use of callback functions by various embodiments are described and illustrated with respect to FIG. 6. The command IDs can be unique and can be auto-generated.

One or more target system support libraries 330 facilitates the target abstraction provided by the middleware component 312. The one or more target system support libraries 330 can represent one or more additional software interface libraries for different target systems that are used by the command engine 322 while executing the test function 320 to access the one or more test methods 314 of the one or more target systems 316. Each target system in the one or more target systems 316 can have a corresponding library in the one or more target system support libraries 330. For example, as shown, the one or more target system support libraries 330 includes a target system support library for software (S/W) model 332 (e.g., C/C++ model), a verification tool 334 (e.g., System Verilog), a simulation tool 336 (e.g., Simulink), a hardware circuit 338 (e.g., FPGA). A target system support library for a given target system can represent a software interface configured to facilitate access of a software interface for a test method provided by the given target system. For example, a target system support library for a given target system can comprise a SWIG-based interface (e.g., Python to C software interface) that enables the command engine 322 to communicate with a software interface (e.g., C software interface) corresponding to a test method provided by the given target system. In this way, each of the one or more target system support libraries 330 can serve as a "glue" between the command engine 322 (e.g., Python side of the middleware component 312) to communicate with a software interface (e.g., C interface) of one the one or more test methods 314. This logical partition (provided via the one or more target system support libraries 330) between the middleware component 312 and the one or more test methods 314 can enable all targets systems to be abstracted and uniformly supported via the middleware component 312.

Each test method of the one or more test methods 314 can provide the middleware component 312 with a software interface to communicate with one or more test methods of the one or more target systems 316. Each of the one or more target systems 316 can provide one or more of languages, tools, or interfaces (e.g., a C/C++ model or System Verilog) that enable an external entity (such as the middleware component 312) to communicate with the target system. For instance, each of the one or more test methods 314 can provide a software interface via a program language structure and a program language function (e.g., C structures and C functions) to control and monitor one of the one or more target systems 316. For instance, each software interface (e.g., C interface) to a test method (of the one or more test methods 314) can comprise a software interface library, where the software interface library can be pre-compiled for a particular target system. Additionally, each software interface (e.g., C interface) to a test method can have a corresponding software interface (e.g., SWIG-based interface between Python and C/C++) in the one or more target system support libraries 330. Each of the one or more target systems 316 can provide (e.g., support) a plurality of test methods. As described herein, the one or more target system support libraries 330 of the middleware component 312 can provide a software interface (e.g., a SWIG-based interface between Python and C/C++) as a "glue" between the middleware component 312 and the one or more test methods 314.

For various embodiments, the software interface of each test method (of the one or more test methods 314) can be standardized (or unified) across all target systems (e.g., all of the one or more target systems 316). The software interface of each test method (of the one or more test methods 314) can be implemented as a C API. The standardized/unified software interface of each of the individual test methods 314 is collectively represented by unified API 360. The unified API 360 can be designed such that all target communication is unified, while permitting further extension for newer/updated target systems. In this way, the standardized/unified software interface is extensible and can evolve. The internal implementation (e.g., support) of each software interface (e.g., non-standard software interface) of a test method of a target system can be contained within the target system. For various embodiments, the standardized/unified software interface of each of the one or more test methods 314 (by the one or more target systems 316) adheres to the unified API 360 for the unification of test methodologies. For instance, if a particular feature cannot be supported by a target system, a stub of that software interface (e.g., C interface) can be included so that it appears as if the particular feature is supported at a higher level but internally stubbed out. In doing so, the standardized/unified software interface of the one or more test methods 314 can ensure full API compliance (e.g., C API compliance), and full API compliance can ensure that a user can design a target-independent test case. As described herein, the use of standardized/unified interfaces to test methods is useful when individual target systems of the one or more target systems 316 provide unique, non-standard (e.g., proprietary) software interfaces for an external entity to communicate, control and execute tests on the individual target systems.

For some embodiments, the unified API 360 unifies non-standard software interfaces to test methods provided by the one or more target systems 316. In this way, the unified API 360 can operate as a translation layer between the middleware component 312 and the one or more test methods 314. For some embodiment, the unified API 360 comprises a collection of definitions of software functions (e.g., C functions) in software files (e.g., one or more C header files). As each target system can have its own set of functions (for test methods) that have to be called from an API function, implementation of each of the software functions (e.g., body of each C function) defined by the unified API 360 is specific to a target system. For instance, the unified API 360 can be C API, and the C API comprises a set of C header files (e.g., defining C functions for the C API) and a set of C libraries (e.g., .so file on Linux) that implement the C functions of the C API. One set of C libraries can exist for each different target system supported by the example testing system of FIG. 3.

Figure 4:
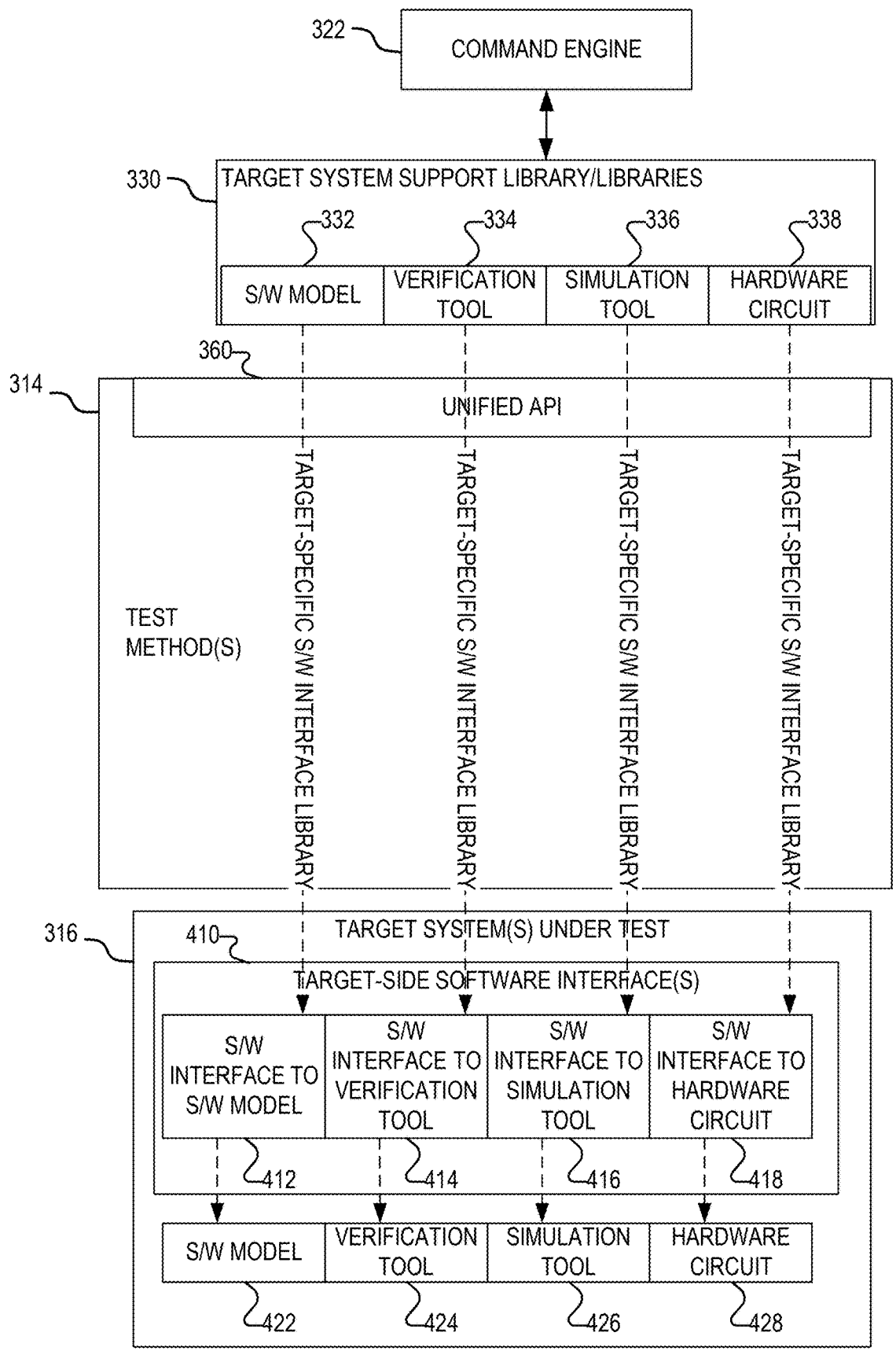

FIG. 4 is a block diagram illustrating portions of the example testing system of FIG. 3 with additional details, in accordance with some embodiments. As shown, the one or more target systems 316 comprise one or more target-side software interfaces 410, and a software (S/W) model 422, a verification tool 424, a simulation tool 426, and a hardware circuit 428. Each of the software (S/W) model 422, the verification tool 424, the simulation tool 426, and the hardware circuit 428 can represent individual target systems, or can represent different test methods of a single target system.

For various embodiments, the one or more target-side software interfaces 410 represent one or more non-standard (e.g., unique or proprietary) software interfaces to be used to access (e.g., test methods provided by) one or more of the S/W model 422, the verification tool 424, the simulation tool 426, and the hardware circuit 428. For instance, a software (S/W) interface 412 can represent a non-standard interface on the one or more target systems 316 to facilitate access of (a test method of) the S/W model 422. A software (S/W) interface 414 can represent a non-standard interface on the one or more target systems 316 to facilitate access of (a test method of) the verification tool 424. A software (S/W) interface 416 can represent a non-standard interface on the one or more target systems 316 to facilitate access of (a test method of) the simulation tool 426. A software (S/W) interface 418 can represent a non-standard interface on the one or more target systems 316 to facilitate access of (a test method of) the hardware circuit 428. As also shown, the unified API 360 comprises multiple target-specific software interface libraries, each corresponding to a different one of the one or more target systems 316. Each of the non-standard software interfaces of the target-side software interfaces 410 can be accessed by a corresponding, target-specific software interface library of the unified API 360.

Figure 5:
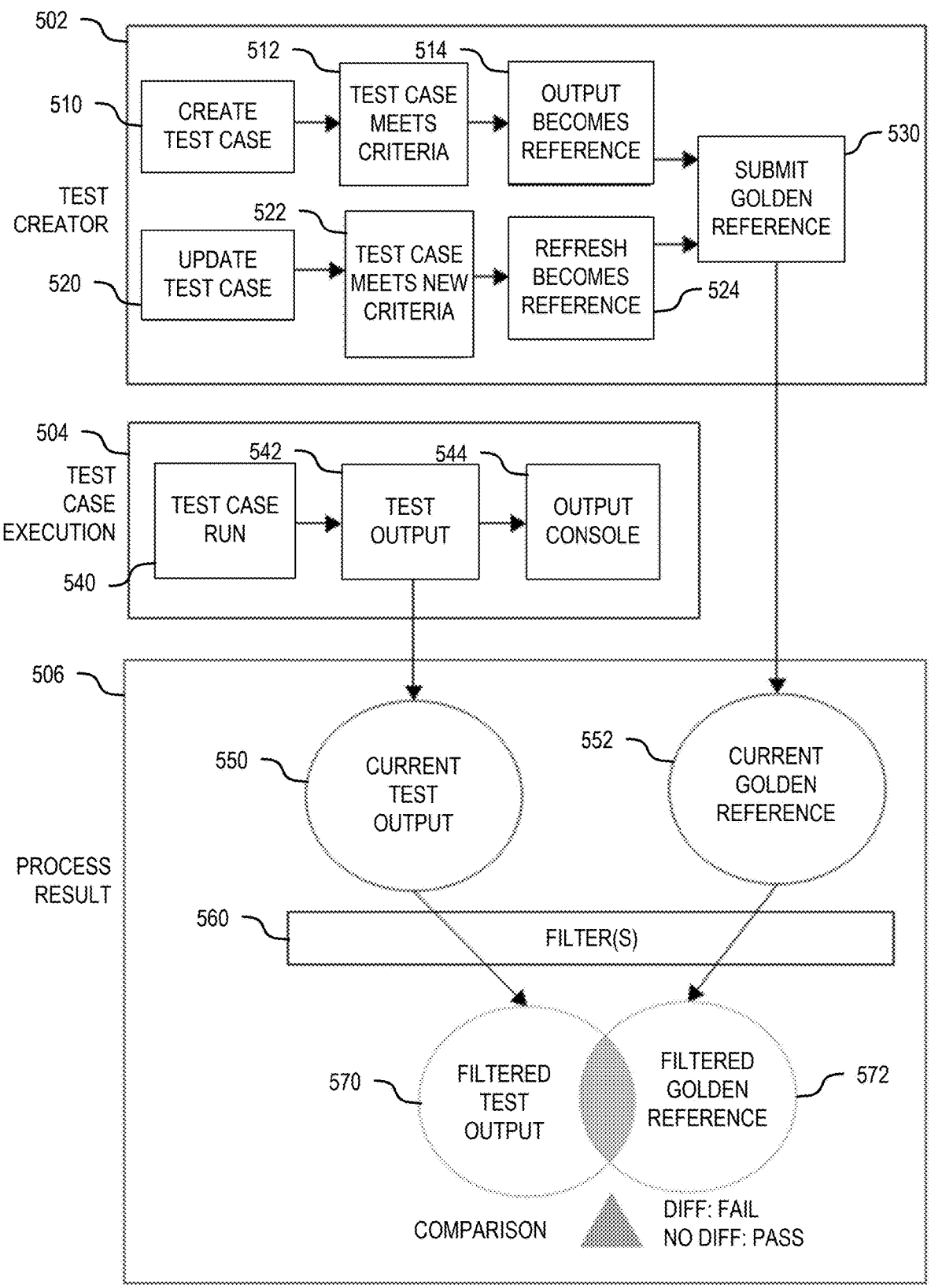
FIG. 5 is a block diagram illustrating an example pass/fail decision based on comparison of a test output with a previously known golden reference, in accordance with some embodiments.

FIG. 5 is a block diagram illustrating an example pass/fail decision based on a comparison of a test output with a previously known golden reference, in accordance with some embodiments. As shown, at stage 502, a golden reference can be generated by a user who is serving as a test creator. At stage 504, test output data is generated by an execution of a test case. At stage 506, a process-result function can be executed by the test case, which can result in a comparison of the test output data (generated at stage 504) to the golden reference (generated at stage 502).

During stage 502, a test creator can create a new test case (510), run it first to satisfaction and when the test meets a test criteria (512) and the test creator obtains a clean (e.g., passing) test run, the test creator can collect the test output (514) and submit the test output as a golden reference to database or datastore (530) (e.g., submit it as a golden console to serve as the golden reference for every subsequent test run for comparison).

If and when the test creator updates the test case (520), the test creator can run it first to satisfaction and when the test meets a new test criteria (522) and the test creator obtains a clean (e.g., passing) test run, the test creator can collect a fresh test output (524) and submit the test output as a new golden reference (e.g., submit it as a golden console to serve as the golden reference for every subsequent test run for comparison). For some embodiments, the test case can have more than one golden reference (e.g., golden console file) when the test case creates more than one type of test output (e.g., event log file, packet JSON file, etc.). The test creator and the test function can specify the types and number of golden references and test outputs for a test case.

During stage 504, after a run of a test case (540), the test output of the test case is collected as test output (542). In addition to the test output being outputted to an output console (544), the test output can be used for further comparison during stage 506.

During stage 506, a current test output 550 and a current golden reference 552 are compared. One or more filters 560 can be applied to each of the current test output 550 and the current golden reference 552 prior to comparison. For some embodiments, the one or more filters 560 remove data that is not suitable for comparison (e.g., real timestamps, debug information in logs, etc.). Data packet data can be directly compared without filtering. The resulting filtered test output 570 and the resulting filtered golden reference 572 can comprise relevant data that can be compared (e.g., processable by a diff tool). Additional filtering rules, such as the removal of white spaces, can be applied as per the desire of the test creator. Where a comparison shows that there is no difference, then the test case passes. Where a comparison shows that there is a difference, then the test case fails.

Figure 6:
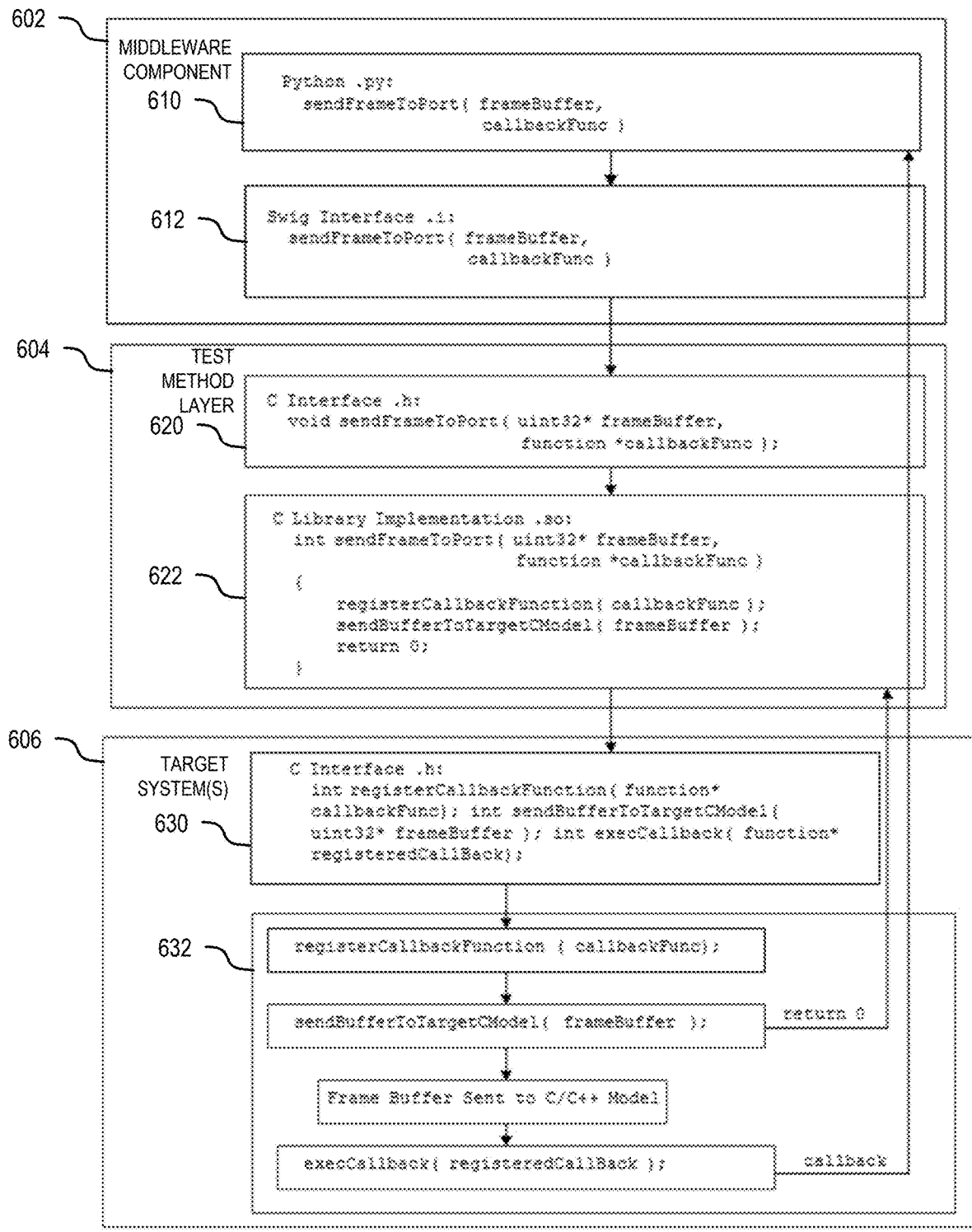
FIG. 6 is a block diagram illustrating an example execution sequence of a test function, in according with some embodiments.

FIG. 6 is a block diagram illustrating an example execution sequence of a test function, in according with some embodiments. As shown, a middleware component 602 receives a test function 610, which is written in Python and which calls at least one target-agnostic test command. The test function 610 is configured to send a data frame to the port. The call to the at least one target-agnostic test command results in a call via a software interface 612 (e.g., SWIG-based interface provided by a target system support library) to a corresponding C API function in a test method layer 606.

As shown, the C API function is implemented in the test method layer 606 by a C header file 620 that defines a C API function and a C library 622 defines a body of the C API function. Each C API function can call one or more target-side C functions within a C interface of one or more target systems 606. Each C API function can be implemented for synchronous or asynchronous execution. As shown, the C interface can be defined on the one or more target systems 606 by a C header file 630.

Execution of a target-side function can be within a main process/thread (632) of the caller or can be forked into a process/thread, thereby facilitating support of as many different target systems as possible without limiting testability. The design and implementation of test methods can enable support of target systems that might have mixed execution methods within the main process or outside the main process as forked processes or threads. A test method can implement a socket-based execution model (e.g., comprising a client-server socket-based implementation).

For some embodiments, for target systems that use separate control and monitor functions, the middleware component 602 can implement asynchronous execution of test commands by using callback functions. For instance, the C API function sendFrameToPort ( . . . ) returns immediately after it registers a callback function. The immediate return can permit the middleware component 604 to proceed with further execution of a test case (e.g., desired) without having to wait for the one or more target systems 606 to complete (e.g., complete sending of the data frame buffer).

After the one or more target systems 606 complete sending (e.g., has sent the data frame to the port), the target system 606 can execute the registered callback function, as shown in 632. This callback function can then be used to notify the middleware component 602 (e.g., via SWIG-based interface of 612) that the execution of the test function 610 has completed and it can take appropriate action (e.g., execute the callback function) based on the completion event.

Figure 7:
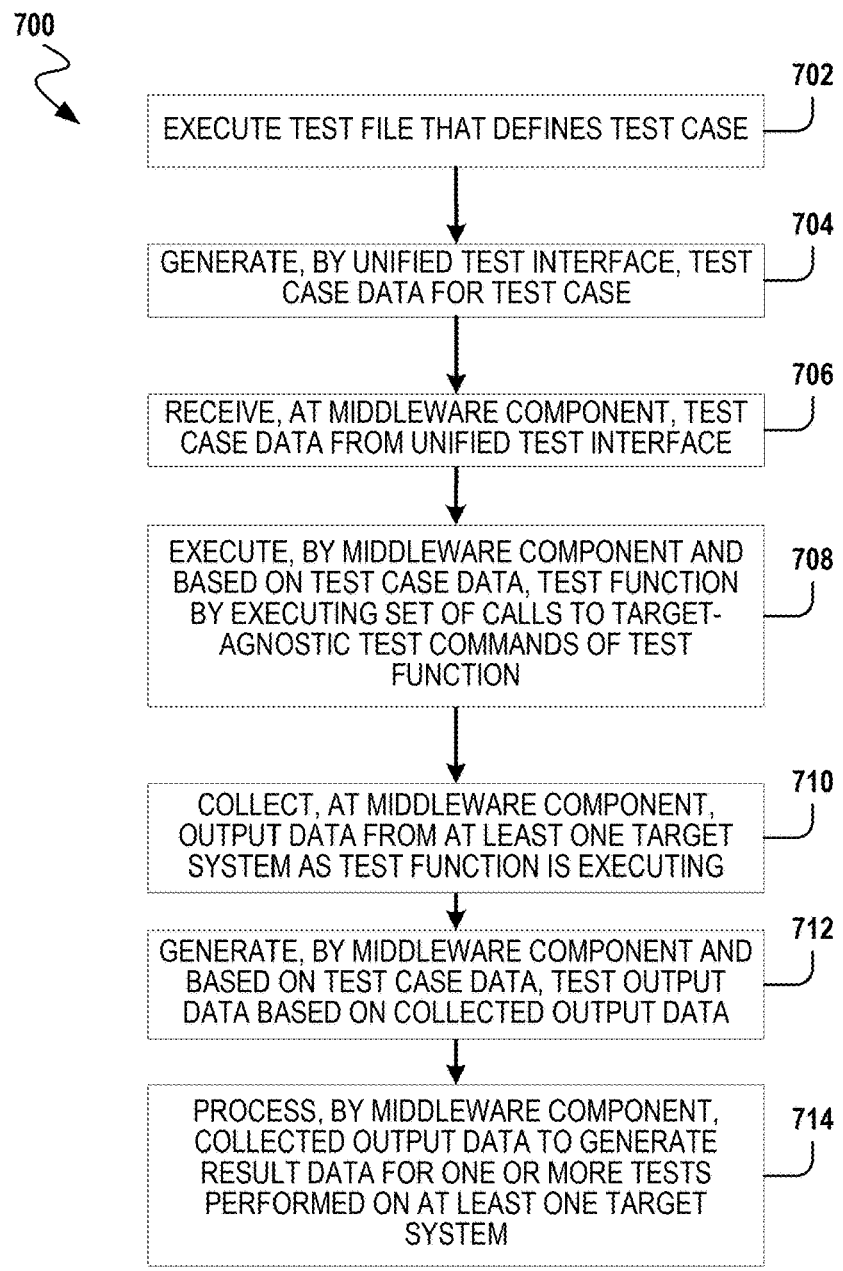
FIG. 7 is a flowchart illustrating an example method for using a testing system that includes a unified interface, in accordance with some embodiments.

FIG. 7 is a flowchart illustrating an example of method 700 for using a testing system that includes a unified interface, in accordance with some embodiments. It will be understood that example methods described herein may be performed by various components (e.g., functional or circuit components). For instance, the testing system 200 is described with respect to FIG. 2 to perform the method 700. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

At operation 702, the one or more hardware processors 202 execute a test file that defines a test case, where the test file uses an application program interface (API) to access the unified test interface 210 and to use the unified test interface 210 to initialize and run a test on at least one target system (e.g., one of the one or more target systems 316) under test. For some embodiments, the unified test interface 210 is implemented by the one or more hardware processors 202.

At operation 704, the unified test interface 210 generates test case data for the test case. For some embodiments, the test case data comprises a definition of a test function that implements the test case, where the test function is defined by a set of calls to target-agnostic test commands. Additionally, for some embodiments, the test case data comprises test input data to be used by the test function during the execution of the test case.

At operation 706, the middleware component 220 receives the test case data from the unified test interface 210. For some embodiments, the middleware component 220 is implemented by the one or more hardware processors 202.

At operation 708, the middleware component 220 executes the test function based on the test case data. For some embodiments, operation 708 comprises executing the set of calls to target-agnostic test commands (of the test function), where the set of calls comprises at least one call to a target-agnostic test command that causes at least one target system (e.g., one of the one or more target systems 316) to be controlled or monitored through at least one software interface library of the test method layer 230. For various embodiments, the at least one software interface library provides access to at least one test method of the at least one target system (e.g., one of the one or more target systems 316). For some embodiments, the test method layer 230 is implemented by the one or more hardware processors 202.

At operation 710, the middleware component 220 collects output data from the at least one target system (e.g., one of the one or more target systems 316) as the test function is executing. For some embodiments, the output data is provided through the least one software interface library used to control or monitor the at least one target system. At operation 712, the middleware component 220 generates, based on the test case data, test output data from the collected output data. For various embodiments, the test output data is in a human-readable format (e.g., JSON file). At operation 714, the middleware component 220 processes the collected output data to generate result data for one or more tests performed on the at least one target system by the test case.

Figure 8:
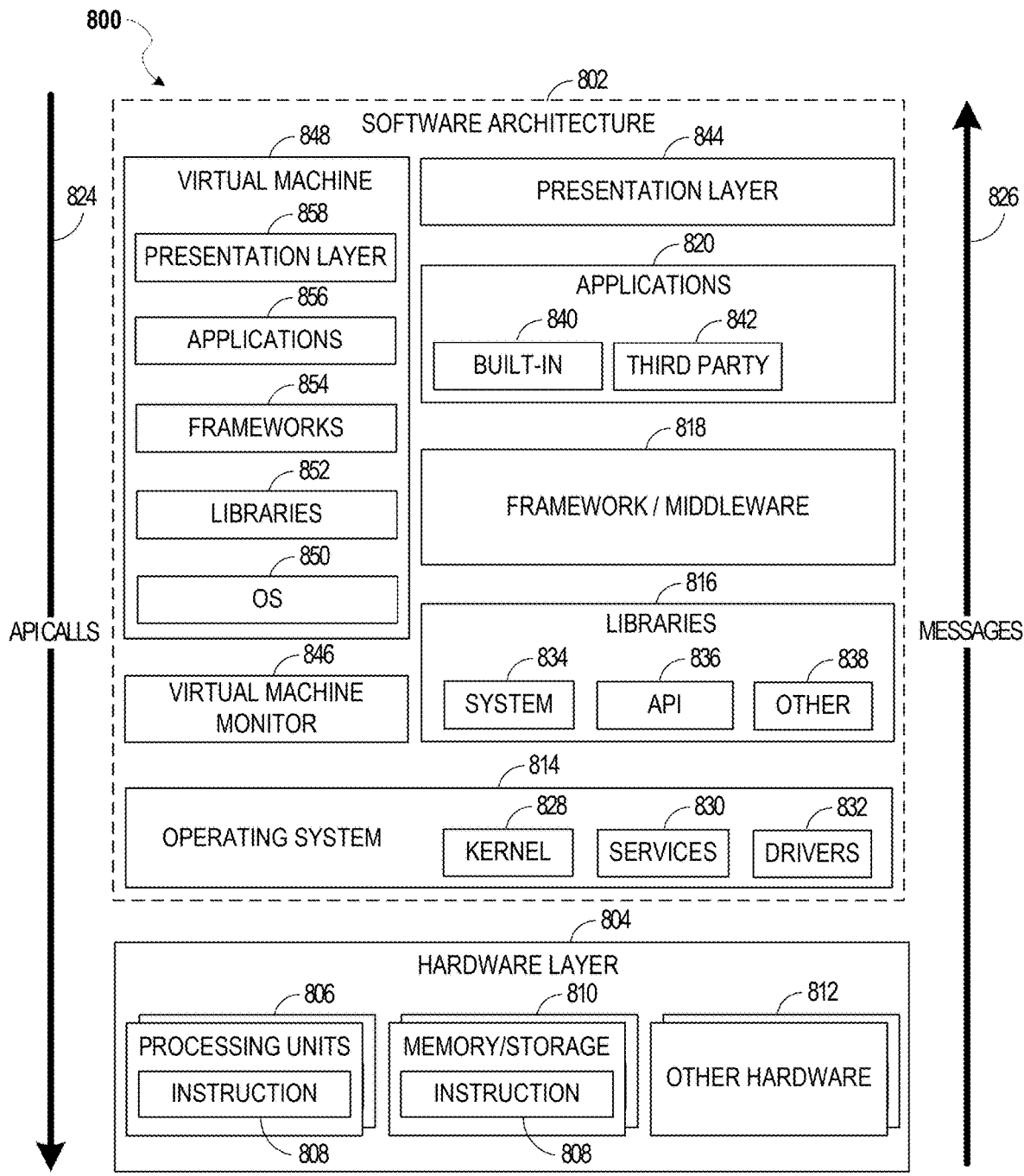
FIG. 8 is a block diagram illustrating a representative software architecture, which can be used in conjunction with various hardware architectures herein described, according to various embodiments.

FIG. 8 is a block diagram illustrating an example of a software architecture 802 that can be installed on a machine, according to some embodiments. FIG. 8 is merely a non-limiting embodiment of a software architecture, and it will be appreciated that many other architectures can be implemented to facilitate the functionality described herein. The software architecture 802 can be executed on hardware such as a machine 900 of FIG. 9 that includes, among other things, processors 910, memory 930, and input/output (I/O) components 950. A representative hardware layer 804 is illustrated and can represent, for embodiment, the machine 900 of FIG. 9. The representative hardware layer 804 comprises one or more processing units 806 having associated executable instructions 808. The executable instructions 808 represent the executable instructions of the software architecture 802. The hardware layer 804 also includes memory or storage modules 810, which also have the executable instructions 808. The hardware layer 804 can also comprise other hardware 812, which represents any other hardware of the hardware layer 804, such as the other hardware illustrated as part of the machine 900.

In the embodiment architecture of FIG. 8, the software architecture 802 can be conceptualized as a stack of layers, where each layer provides particular functionality. For embodiment, the software architecture 802 can include layers such as an operating system 814, libraries 816, frameworks/middleware 818, applications 820, and a presentation layer 844. Operationally, the applications 820 or other components within the layers can invoke API calls 824 through the software stack and receive a response, returned values, and so forth (illustrated as messages 826) in response to the API calls 824. The layers illustrated are representative in nature, and not all software architectures have all layers. For embodiment, some mobile or special-purpose operating systems cannot provide a frameworks/middleware 818 layer, while others can provide such a layer. Other software architectures can include additional or different layers.

The operating system 814 can manage hardware resources and provide common services. The operating system 814 can include, for embodiment, a kernel 828, services 830, and drivers 832. The kernel 828 can act as an abstraction layer between the hardware and the other software layers. For embodiment, the kernel 828 can be responsible for memory management, processor management (e.g., scheduling), component management, networking, security settings, and so on. The services 830 can provide other common services for the other software layers. The drivers 832 can be responsible for controlling or interfacing with the underlying hardware. For instance, the drivers 832 can include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 can provide a common infrastructure that can be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, or drivers 832). The libraries 816 can include system libraries 834 (e.g., C standard library) that can provide functions such as memory allocation functions, string manipulation functions, mathematic functions, and the like. In addition, the libraries 816 can include API libraries 836 such as media libraries (e.g., libraries to support presentation and manipulation of various media formats such as MPEG4, H.264, MP3, AAC, AMR, JPG, and PNG), graphics libraries (e.g., an OpenGL framework that can be used to render 2D and 3D graphic content on a display), database libraries (e.g., SQLite that can provide various relational database functions), web libraries (e.g., WebKit that can provide web browsing functionality), and the like. The libraries 816 can also include a wide variety of other libraries 838 to provide many other APIs to the applications 820 and other software components/modules.

The frameworks 818 (also sometimes referred to as middleware) can provide a higher-level common infrastructure that can be utilized by the applications 820 or other software components/modules. For embodiment, the frameworks 818 can provide various graphical user interface functions, high-level resource management, high-level location services, and so forth. The frameworks 818 can provide a broad spectrum of other APIs that can be utilized by the applications 820 and/or other software components/modules, some of which can be specific to a particular operating system or platform.

The applications 820 include built-in applications 840 and/or third-party applications 842. Embodiments of representative built-in applications 840 can include, but are not limited to, a home application, a contacts application, a browser application, a book reader application, a location application, a media application, a messaging application, or a game application.

The third-party applications 842 can include any of the built-in applications 840, as well as a broad assortment of other applications. In a specific embodiment, the third-party applications 842 (e.g., an application developed using the Android™ or iOS™ software development kit (SDK) by an entity other than the vendor of the particular platform) can be mobile software running on a mobile operating system such as iOS™, Android™, or other mobile operating systems. In this embodiment, the third-party applications 842 can invoke the API calls 824 provided by the mobile operating system such as the operating system 814 to facilitate functionality described herein.

The applications 820 can utilize built-in operating system functions (e.g., kernel 828, services 830, or drivers 832), libraries (e.g., system libraries 834, API libraries 836, and other libraries 838), or frameworks/middleware 818 to create user interfaces to interact with users of the system. Alternatively, or additionally, in some systems, interactions with a user can occur through a presentation layer, such as the presentation layer 844. In these systems, the application/module "logic" can be separated from the aspects of the application/module that interact with the user.

Some software architectures utilize virtual machines. In the embodiment of FIG. 8, this is illustrated by a virtual machine 848. The virtual machine 848 creates a software environment where applications/modules can execute as if they were executing on a hardware machine (e.g., the machine 900 of FIG. 9). The virtual machine 848 is hosted by a host operating system (e.g., the operating system 814) and typically, although not always, has a virtual machine monitor 846, which manages the operation of the virtual machine 848 as well as the interface with the host operating system (e.g., the operating system 814). A software architecture executes within the virtual machine 848, such as an operating system 850, libraries 852, frameworks/middleware 854, applications 856, or a presentation layer 858. These layers of software architecture executing within the virtual machine 848 can be the same as corresponding layers previously described or can be different.

Figure 9:
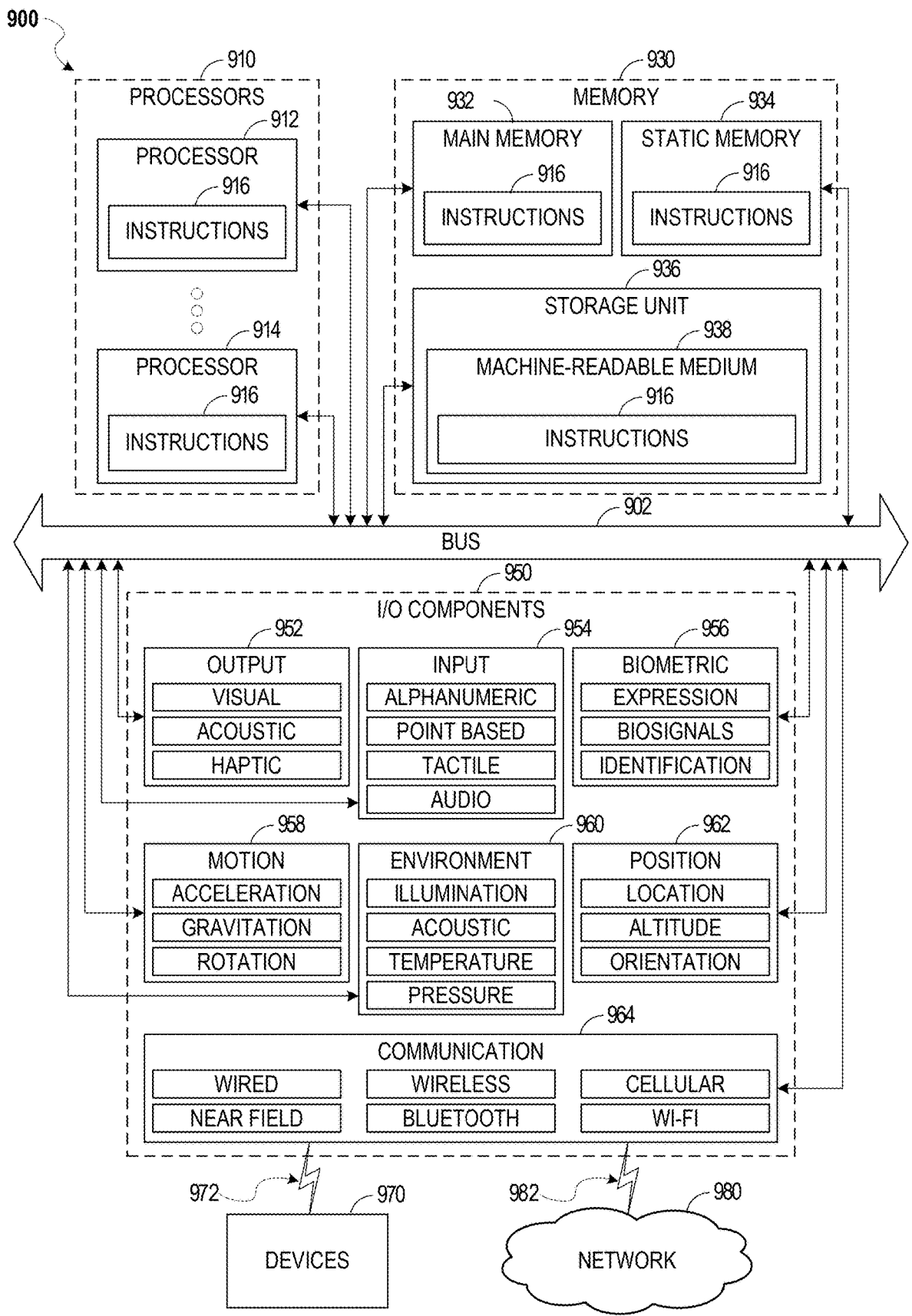
FIG. 9 is a block diagram illustrating components of a machine able to read instructions from a machine storage medium and perform any one or more of the methodologies discussed herein according to various embodiments.

FIG. 9 illustrates a diagrammatic representation of a machine 900 in the form of a computer system within which a set of instructions can be executed for causing the machine 900 to perform any one or more of the methodologies discussed herein, according to an embodiment. Specifically, FIG. 9 shows a diagrammatic representation of the machine 900 in the embodiment form of a computer system, within which instructions 916 (e.g., software, a program, an application, an applet, an app, or other executable code) for causing the machine 900 to perform any one or more of the methodologies discussed herein can be executed. For embodiment, the instructions 916 can cause the machine 900 to execute the method 700 described above with respect to FIG. 7. The instructions 916 transform the general, non-programmed machine 900 into a particular machine 900 programmed to carry out the described and illustrated functions in the manner described. In some embodiments, the machine 900 operates as a standalone device or can be coupled (e.g., networked) to other machines. In a networked deployment, the machine 900 can operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 can include processors 910, memory 930, and I/O components 950, which can be configured to communicate with each other such as via a bus 902. In an embodiment, the processors 910 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) can include, for embodiment, a processor 912 and a processor 914 that can execute the instructions 916. The term "processor" is intended to include multi-core processors that can comprise two or more independent processors (sometimes referred to as "cores") that can execute instructions contemporaneously. Although FIG. 9 shows multiple processors 910, the machine 900 can include a single processor with a single core, a single processor with multiple cores (e.g., a multi-core processor), multiple processors with a single core, multiple processors with multiples cores, or any combination thereof.

The memory 930 can include a main memory 932, a static memory 934, and a storage unit 936 including machine-readable medium 938, each accessible to the processors 910 such as via the bus 902. The main memory 932, the static memory 934, and the storage unit 936 store the instructions 916 embodying any one or more of the methodologies or functions described herein. The instructions 916 can also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 can include a wide variety of components to receive input, provide output, produce output, transmit information, exchange information, capture measurements, and so on. The specific I/O components 950 that are included in a particular machine will depend on the type of machine. For embodiment, portable machines such as mobile phones will likely include a touch input device or other such input mechanisms, while a headless server machine will likely not include such a touch input device. It will be appreciated that the I/O components 950 can include many other components that are not shown in FIG. 9. The I/O components 950 are grouped according to functionality merely for simplifying the following discussion, and the grouping is in no way limiting. In various embodiments, the I/O components 950 can include output components 952 and input components 954. The output components 952 can include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 950 can include biometric components 956, motion components 958, environmental components 960, or position components 962, among a wide array of other components. The motion components 958 can include acceleration sensor components (e.g., accelerometer), gravitation sensor components, rotation sensor components (e.g., gyroscope), and so forth. The environmental components 960 can include, for embodiment, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 962 can include location sensor components (e.g., a Global Positioning System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 950 can include communication components 964 operable to couple the machine 900 to a network 980 or devices 970 via a coupling 982 and a coupling 972, respectively. For embodiment, the communication components 964 can include a network interface component or another suitable device to interface with the network 980. In further embodiments, the communication components 964 can include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 can be another machine or any of a wide variety of peripheral devices (e.g., a peripheral device coupled via a USB).

Moreover, the communication components 964 can detect identifiers or include components operable to detect identifiers. For embodiment, the communication components 964 can include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 964, such as location via Internet Protocol (IP) geolocation, location via Wi-Fi® signal triangulation, location via detecting an NFC beacon signal that can indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In various embodiments, a hardware module is implemented mechanically, electronically, or any suitable combination thereof. For embodiment, a hardware module can include dedicated circuitry or logic that is permanently configured to perform certain operations. For embodiment, a hardware module can be a special-purpose processor, such as a field-programmable gate array (FPGA) or an ASIC. A hardware module can also include programmable logic or circuitry that is temporarily configured by software to perform certain operations. For embodiment, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. In various embodiments, where a hardware module includes a general-purpose processor configured by software to become a special-purpose processor, the general-purpose processor can be configured as respectively different special-purpose processors (e.g., comprising different hardware modules) at different times. Software can accordingly configure a particular processor or processors, for embodiment, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules can be achieved, for embodiment, through the storage and retrieval of information in memory structures to which the multiple hardware modules have access. For embodiment, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of embodiment methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For embodiment, at least some of the operations of a method can be performed by one or more processors or processor-implemented modules. Moreover, the one or more processors can also operate to support performance of the relevant operations in a "cloud computing" environment or as a "software as a service" (SaaS). For embodiment, at least some of the operations can be performed by a group of computers (as embodiments of machines 900 including processors 910), with these operations being accessible via a network (e.g., the Internet) and via one or more appropriate interfaces (e.g., an API). In certain embodiments, for embodiment, a client device can relay or operate in communication with cloud computing systems and can access circuit design information in a cloud environment.

The performance of certain of the operations can be distributed among the processors, not only residing within a single machine 900, but deployed across a number of machines 900. In some embodiment embodiments, the processors 910 or processor-implemented modules are located in a single geographic location (e.g., within a home environment, an office environment, or a server farm). In other embodiments, the processors or processor-implemented modules are distributed across a number of geographic locations.

Executable Instructions and Machine Storage Medium

The various memories (i.e., 930, 932, 934, and/or the memory of the processor(s) 910) and/or the storage unit 936 can store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and can be used interchangeably. The terms refer to a single or multiple storage devices and/or media (e.g., a centralized or distributed database, and/or associated caches and servers) that store executable instructions 916 and/or data. The terms shall accordingly be taken to include, but not be limited to, solid-state memories, and optical and magnetic media, including memory internal or external to processors. Specific embodiments of machine-storage media, computer-storage media and/or device-storage media include non-volatile memory, including by way of embodiment semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 980 can be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For embodiment, the network 980 or a portion of the network 980 can include a wireless or cellular network, and the coupling 982 can be a Code Division Multiple Access (CDMA) connection, a Global System for Mobile communications (GSM) connection, or another type of cellular or wireless coupling. In this embodiment, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions can be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions can be transmitted or received using a transmission medium via the coupling (e.g., a peer-to-peer coupling) to the devices 970. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and can be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances can implement resources, components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in embodiment configurations can be implemented as a combined structure or component. Similarly, structures and functionality presented as a single component can be implemented as separate components.

As used herein, the term "or" can be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases can be absent. Additionally, boundaries between various resources, operations, modules, engines, and data stores are somewhat arbitrary, and particular operations are illustrated in a context of specific illustrative configurations. Other allocations of functionality are envisioned and can fall within a scope of various embodiments. The specification and drawings are, accordingly, to be regarded in an illustrative rather than a restrictive sense.

It will be understood that changes and modifications can be made to the disclosed embodiments without departing from the scope of the present disclosure. These and other changes or modifications are intended to be included within the scope of the present disclosure.

What is claimed is:

1. A testing system comprising:
   one or more hardware processors;
   a unified test interface implemented by the one or more hardware processors, wherein the unified test interface is accessible via a first application program interface (API), wherein the first application program interface (API) defines a set of test case functions in a first programming language, and wherein the first application program interface (API) is configured to provide access of the set of test case functions to test cases that are defined using the first programming language and that use the set of test case functions through the unified test interface to define and run tests with respect to at least one target system under test;
   a test method layer implemented by the one or more hardware processors, wherein the test method layer comprises a plurality of software interface libraries defining a common software interface for different test methods of different target systems; and
   a middleware component implemented by the one or more hardware processors, wherein the middleware component is configured to:
      receive test case data for a test case from the unified test interface, wherein the test case data comprises a definition of a test function that implements the test case, and wherein the test function is defined by a set of calls to a set of target-agnostic test commands supported by the middleware component; and
      execute, based on the test case data, the test function by executing the set of calls to the set of target-agnostic test commands, wherein the set of calls comprises at least one call to a target-agnostic test command that causes the at least one target system under test to be controlled or monitored through at least one software interface library of the test method layer, and wherein the at least one software interface library of the test method layer provides access to at least one test method of the at least one target system under test.

2. The testing system of claim 1, wherein each of the plurality of software interface libraries of the test method layer complies with a common application program interface (API).

3. The testing system of claim 1, wherein the middleware component comprises a target system support library that the middleware component uses to access the at least one software interface library of the test method layer.

4. The testing system of claim 1, wherein the at least one test method of the at least one target system under test is associated with one of modeling, verification, simulation, emulation, or validation.

5. The testing system of claim 1, wherein the test case is implemented in a test script that comprises a plurality of statements in the first programming language.

6. The testing system of claim 1, wherein the unified test interface is accessible via a second application program interface (API), wherein the second application program interface (API) defines the set of test case functions in a second programming language, and wherein the second application program interface (API) is configured to provide access to the set of test case functions to test cases that are defined using the second programming language and that use the set of test case functions through the unified test interface to define and run tests with respect to the at least one target system under test.

7. The testing system of claim 1, wherein the set of test case functions comprises an initialization function to define the test case, and wherein execution of the initialization function causes the test case data to be sent from the unified test interface to the middleware component.

8. The testing system of claim 7, wherein an input parameter of the initialization function comprises:
   a first parameter specifying the test function that implements the test case; and
   a second parameter specifying test input data to be used by the test function during execution of the test case, wherein the test case data comprises the test input data.

9. The testing system of claim 1, wherein the set of test case functions comprises a configure function to request one or more resources for executing the test case by the middleware component.

10. The testing system of claim 1, wherein the set of test case functions comprises a run function to start execution of the test case by the middleware component.

11. The testing system of claim 1, wherein the set of test case functions comprises a process-result function to process output data collected by the middleware component from the at least one target system under test during execution of the test case.

12. The testing system of claim 1, wherein the set of target-agnostic test commands comprises at least one of a logging command, a monitoring command, a breakpoint command, a trigger command, or an event capture command.

13. The testing system of claim 1, wherein the middleware component is further configured to generate test output data based on execution of the test case, and wherein the test output data comprises data collected by the middleware component during the execution of the test case.

14. The testing system of claim 1, wherein the at least one software interface library of the test method layer is either in source form or precompiled form for the at least one target system under test.

15. The testing system of claim 1, wherein the plurality of software interface libraries comprises:
   a first software library precompiled for a first target system of the at least one target system under test and a second software library precompiled for a second target system of the at least one target system under test.

16. The testing system of claim 1, wherein the at least one target system under test comprises at least one of a software-defined model, a hardware simulation, a test bench tool, a field-programmable gate array (FPGA), or an application-specific integrated circuit (ASIC).

17. A method comprising:
   executing, by one or more hardware processors, a test file that defines a test case, wherein the test file uses a first application program interface (API) to access a unified test interface of a testing system and to use the unified test interface of the testing system to initialize and run a test on at least one target system under test, and wherein the unified test interface of the testing system is implemented by the one or more hardware processors;

generating, by the unified test interface of the testing system, test case data for the test case, wherein the test case data comprises:
- a definition of a test function that implements the test case, wherein the test function is defined by a set of calls to a set of target-agnostic test commands; and
- test input data to be used by the test function during the execution of the test file;

receiving, at a middleware component of the testing system, the test case data from the unified test interface of the testing system, wherein the middleware component of the testing system is implemented by the one or more hardware processors; and executing, by the middleware component of the testing system and based on the test case data, the test function by executing the set of calls to the set of target-agnostic test commands, wherein the set of calls comprises at least one call to a target-agnostic test command that causes the at least one target system under test to be controlled or monitored through at least one software interface library of a test method layer of the testing system, wherein the test method layer of the testing system is implemented by the one or more hardware processors, and wherein the at least one software interface library provides access to at least one test method of the at least one target system under test.

18. The method of claim 17, further comprising:
collecting, at the middleware component of the testing system, output data from the at least one target system under test as the test function is executing, wherein the collected output data is provided through the at least one software interface library; and generating, by the middleware component of the testing system and based on the test case data, test output data from the collected output data, wherein the test output data is in a human-readable format.

19. The method of claim 17, further comprising:
collecting, at the middleware component of the testing system, output data from the at least one target system under test as the test function is executing, wherein the collected output data is provided through the at least one software interface library; and processing, by the middleware component of the testing system, the collected output data to generate result data for one or more tests performed on the at least one target system under test by the test case.

20. A non-transitory computer-readable medium storing instructions that, when executed by a hardware processor of a computing device, cause the computing device to perform operations comprising:

executing a test file that defines a test case, wherein the test file uses a first application program interface (API) to access a unified test interface of a testing system and to use the unified test interface of the testing system to initialize and run a test on at least one target system under test, and wherein the unified test interface of the testing system is implemented by the hardware processor of the computing device;

generating, by the unified test interface of the testing system, test case data for the test case, wherein the test case data comprises:
- a definition of a test function that implements the test case, wherein the test function is defined by a set of calls to a set of target-agnostic test commands; and
- test input data to be used by the test function during the execution of the test file;

receiving, at a middleware component of the testing system, the test case data from the unified test interface of the testing system, wherein the middleware component of the testing system is implemented by the hardware processor of the computing device; and executing, by the middleware component of the testing system and based on the test case data, the test function by executing the set of calls to the set of target-agnostic test commands, wherein the set of calls comprises at least one call to a target-agnostic test command that causes the at least one target system under test to be controlled or monitored through at least one software interface library of a test method layer of the testing system, wherein the test method layer of the testing system is implemented by the hardware processor of the computing device, and wherein the at least one software interface library provides access to at least one test method of the at least one target system under test.

\* \* \* \* \*